(12) United States Patent
Myerberg et al.

(10) Patent No.: US 7,927,732 B2
(45) Date of Patent: Apr. 19, 2011

(54) BATTERY CELL DESIGN AND METHOD OF ITS CONSTRUCTION

(75) Inventors: Jonah S. Myerberg, Waltham, MA (US); Donald G. Dafoe, Marlborough, MA (US); Grace S. Chang, Watertown, MA (US); Andrew C. Chu, Cambridge, MA (US); Hung-Chieh Shiao, Sudbury, MA (US)

(73) Assignee: A123 Systems, Inc., Watertown, MA (US)

( * ) Notice: Subject to any disclaimer, the term of this patent is extended or adjusted under 35 U.S.C. 154(b) by 1205 days.

(21) Appl. No.: 11/515,597

(22) Filed: Sep. 5, 2006

(65) Prior Publication Data

US 2007/0117011 A1 May 24, 2007

Related U.S. Application Data

(60) Provisional application No. 60/714,171, filed on Sep. 2, 2005.

(51) Int. Cl.
*H01M 2/26* (2006.01)

(52) U.S. Cl. ........ 429/161; 429/163; 429/164; 429/170; 429/211

(58) Field of Classification Search .......... 429/161–164, 429/170
See application file for complete search history.

(56) References Cited

U.S. PATENT DOCUMENTS

| | | | |
|---|---|---|---|
| 4,400,415 A * | 8/1983 | Kessler et al. ............... 427/305 |
| 4,966,822 A | 10/1990 | Johnston |
| 5,464,705 A | 11/1995 | Wainwright |
| 5,554,459 A | 9/1996 | Gozdz et al. |
| 5,773,164 A * | 6/1998 | Venkatesan et al. ......... 429/161 |
| 5,834,133 A | 11/1998 | Narukawa et al. |
| 5,866,274 A * | 2/1999 | Mawston et al. ............. 429/9 |
| 5,876,237 A * | 3/1999 | Patel et al. .................. 439/441 |
| 6,080,506 A | 6/2000 | Davis et al. |
| 6,159,253 A | 12/2000 | Lund |
| 6,197,074 B1 * | 3/2001 | Satou et al. .................. 29/623.1 |
| 6,344,292 B1 | 2/2002 | Nemoto et al. |
| 6,432,574 B1 | 8/2002 | Suzuki et al. |
| 6,521,374 B1 * | 2/2003 | Nakanishi et al. ........... 429/178 |
| 6,673,128 B2 | 1/2004 | Payne et al. |
| RE38,518 E | 5/2004 | Tucholski |
| 6,780,303 B2 | 8/2004 | Colombier |
| 6,875,540 B2 | 4/2005 | Nemoto et al. |
| 6,884,541 B2 | 4/2005 | Enomoto et al. |
| 7,033,697 B2 * | 4/2006 | Park et al. .................... 429/211 |
| 2001/0038945 A1 * | 11/2001 | Kitoh et al. .................. 429/211 |
| 2003/0091893 A1 | 5/2003 | Kishiyama et al. |
| 2003/0175587 A1 | 9/2003 | Okutani et al. |
| 2003/0194601 A1 | 10/2003 | Lei |
| 2003/0211388 A1 | 11/2003 | Ruth et al. |
| 2004/0023108 A1 * | 2/2004 | Nakanishi et al. ........... 429/178 |
| 2004/0121230 A1 | 6/2004 | Fong et al. |
| 2004/0157115 A1 | 8/2004 | Bouffard et al. |
| 2004/0157120 A1 | 8/2004 | Wu |
| 2004/0214076 A1 | 10/2004 | Tsukamoto et al. |
| 2004/0237290 A1 | 12/2004 | Ura |
| 2004/0265683 A1 | 12/2004 | Merrill et al. |
| 2005/0255378 A1 * | 11/2005 | Knight et al. ................ 429/122 |
| 2006/0124973 A1 * | 6/2006 | Arai et al. .................... 257/223 |
| 2006/0172190 A1 * | 8/2006 | Kaplin et al. ................ 429/161 |
| 2007/0117011 A1 | 5/2007 | Myerberg et al. |
| 2009/0109099 A1 * | 4/2009 | Jang et al. ................... 343/702 |

FOREIGN PATENT DOCUMENTS

| EP | 0771040 A2 | 5/1997 |
| WO | WO-2005/076936 | 8/2005 |

OTHER PUBLICATIONS

International Search Report, International Application No. PCT/US2006/34478, mailed Aug. 13, 2007. (1 Page).

* cited by examiner

*Primary Examiner* — Patrick Ryan
*Assistant Examiner* — Ladan Mohaddes
(74) *Attorney, Agent, or Firm* — Wilmer Cutler Pickering Hale and Dorr LLP

(57) ABSTRACT

A compact, robust, multifunctional and highly manufacturable rechargeable battery cell is provided. The cell design dedicates minimal internal volume to inert components of the cell. This is accomplished, in part, by providing multiple functionalities to individual cell components.

23 Claims, 4 Drawing Sheets

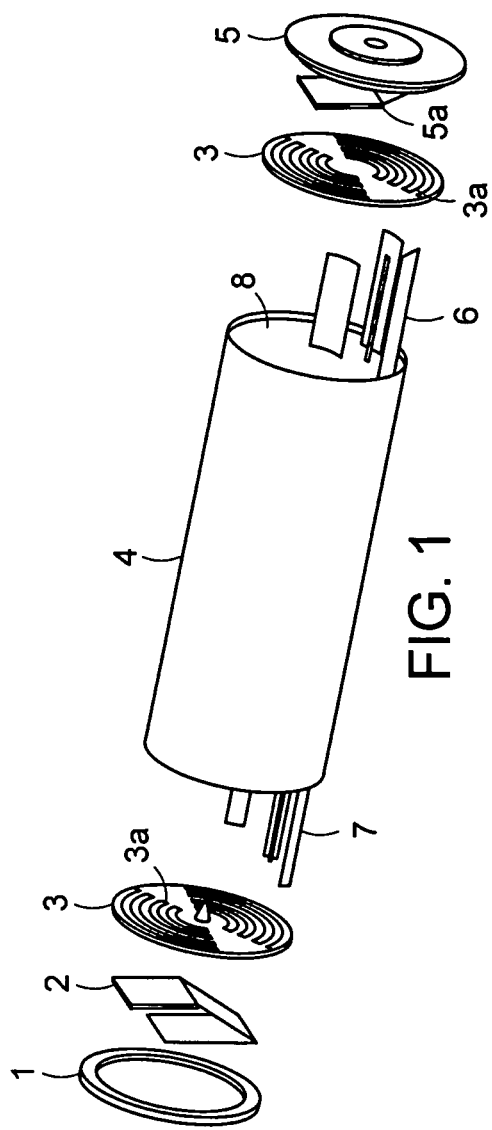
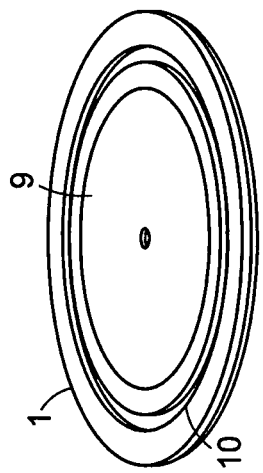
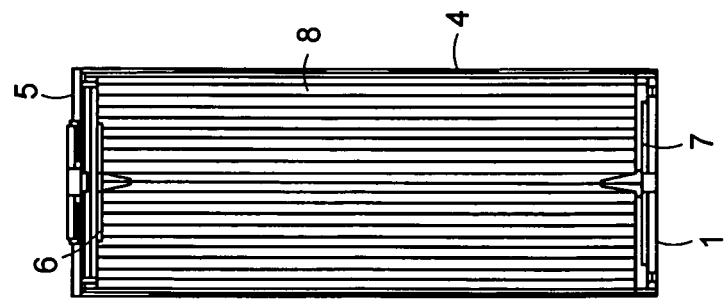

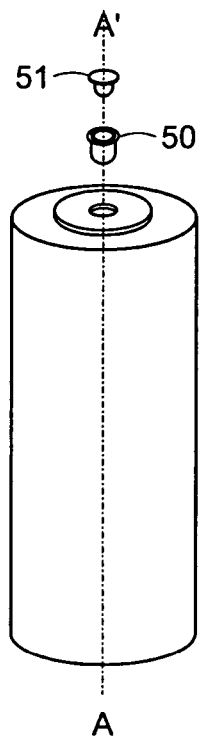
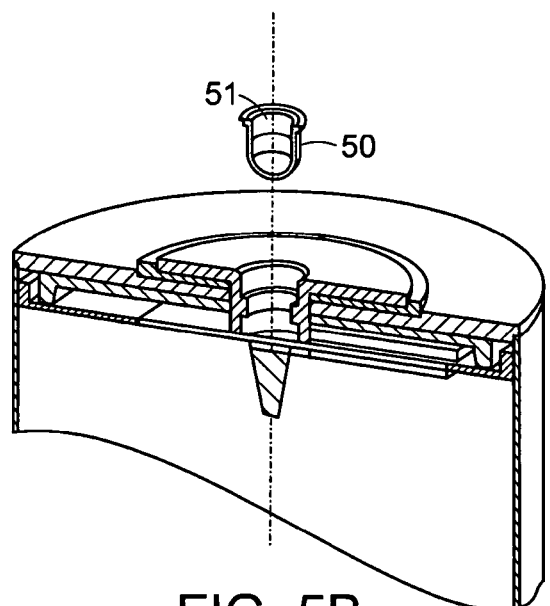
FIG. 5B
FIG. 5A
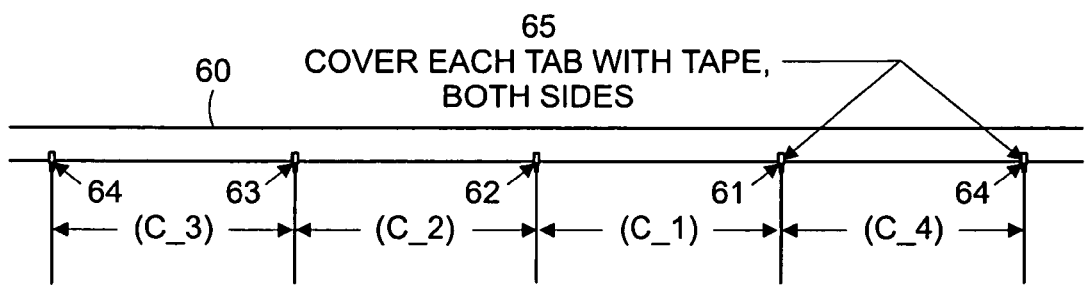
FIG. 6A
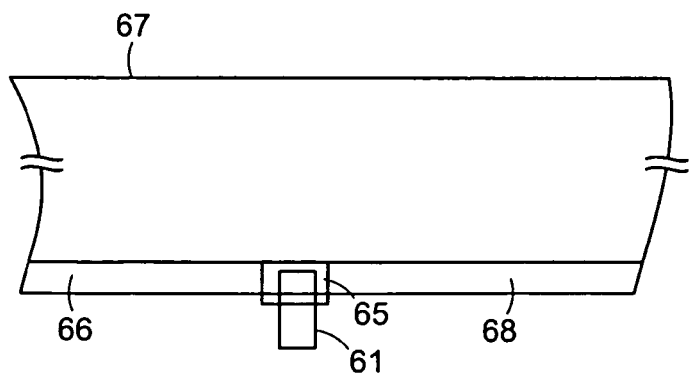
FIG. 6B

BATTERY CELL DESIGN AND METHOD OF ITS CONSTRUCTION

RELATED APPLICATION

This application claims priority under 35 U.S.C. §119(e) to co-pending U.S. Application Ser. No. 60/714,171, filed Sep. 2, 2005, and entitled "Battery Cell Design and Method of its Construction," the contents of which are hereby incorporated by reference in their entirety.

FIELD OF THE INVENTION

The present invention generally relates to an electrochemical battery cell. More particularly, the present invention relates to a compact, robust, multifunctional and highly manufacturable rechargeable battery cell.

BACKGROUND

Increasing the discharge capacity of electrochemical cells is an ongoing objective of manufacturers of electrochemical cells and batteries. Often there are certain maximum external dimensions that place constraints on the volume of a given type of cell or battery. These maximum dimensions may be imposed through industry standards or by the amount of space available in the device into which the cells or batteries can be put. Only a portion of the volume is available for the materials necessary for the electrochemical discharge reactions (electrochemically active materials and electrolyte), because other essential, but inert, components (e.g., containers, seals, terminals, current collectors, and separators) also take up volume. A certain amount of void volume may also be necessary inside the cells to accommodate reaction products and increases in material volumes due to other factors, such as Increasing temperature. To maximize discharge capacity in a cell or battery with a limited or set volume, it is desirable to minimize the volumes of inert components and void volumes.

Conventional battery cell designs incorporate a single open ended prismatic or cylindrical cell can and one matching cell end cap, used to hermetically seal the cell's internal components from the outside world. The construction and design of the cell's end cap and the manner in which it mounts to the cell's can directly effect how the cell is "activated," or internally saturated with electrolyte, how the cell vents gas during an unsafe high pressure event, and how the cell's internal active materials are connected to its external power terminals.

A cylindrical cell is typically activated by first saturating the cell's internal components with electrolyte and then assembling the end cap to the can. Attempts to create a robust hermetic seal between the cell's can and the cell's end cap after the cell has been activated are complicated by the presence of electrolyte. This becomes especially true when using a welding process at this seam. Conventional cylindrical battery cell design avoids this problem by using non-welding techniques, such as crimping, to seal the end cap to the can after electrolyte fill. These crimping techniques are not an efficient use of cell volume and reduce the total energy capacity of a cell.

Conventional prismatic cell designs create a hermetic and volumetrically efficient weld joint between the end cap and can before activating the cell. Activation in a prismatic cell is typically achieved by saturating the internal components with electrolyte introduced through a small opening in the sealed end cap, called a fill hole. After activation is complete, this fill hole is then hermetically sealed by various means. In welded cell designs, the task of hermetically sealing the fill hole is challenging. This seal is typically achieved by the addition of parts as well as some sort of curing adhesive or an additional weld, resulting in a protrusion over the fill hole that has to be managed during cell usage. Additionally, this fill hole is typically placed off center to give central placement priority to the power terminal. In volumetrically efficient cell designs, the wall thickness where this fill hole exists is often very thin, making sealing even more challenging. The result is a highly uncontrollable, unreliable, and in-the-way fill-hole seal.

Electrochemical cells are capable of generating gas, during storage, during normal operation, and, especially, under common abusive conditions, such as forced deep discharging and, for primary cells, charging. Cells are designed to release internal pressure in a controlled manner. A common approach is to provide a pressure relief mechanism, or vent, which releases gases from the cell when the internal pressure exceeds a predetermined level. Pressure relief vents often take up additional internal volume because clearance is generally needed between the vent and other cell or battery components in order to insure proper mechanical operation of the mechanism.

A cylindrical cell is vented using a complex valve designed to initially cut off current flow when a certain internal pressure is reached and then ultimately open when the cell experiences a higher internal pressure threshold. When the valve actuates, the cell is usually considered unusable. Vent mechanisms in cylindrical cells tend to be "hidden" under the battery terminal so that they take up less space on the end cap. In addition to using up valuable cell volume that could otherwise be used for cell capacity, this results in a series of small vent "windows" in the end cap that are designed to allow gas to escape from during a high pressure event. Often, when a cell experiences this type of event, materials other than gas try to escape from the cell through this vent and end up clogging these windows. This defeats the purpose of the vent, preventing gas from escaping, and the cell ends up reaching critical internal pressures and often explodes.

Venting in a prismatic cell occurs for the same reasons as in a cylindrical cell, but is usually less of mechanism and more of an area of increased mechanical stress concentration. Typical vent designs in prismatic cells are engineered holes that burst at specific pressures. Vents, if even present in prismatic cells, are typically very small by design in order to share end cap space with the fill hole and the battery terminal. These small vents can result in similar clogs and ultimately the same explosions.

Another component of electrochemical cells are current collectors. Small electrically conductive current collectors, or tabs, typically make the connections between a cell's internal active material and its external power terminals. Due to chemical compatibility and corrosion problems, these tabs are limited to a few metal types, depending on whether the tabs are on the anode (−) or cathode (+) potential of the cell. Most cylindrical cells make their cans out of a steel alloy, which forces the can to be at anode (−) potential. This allows the active internal anode material to be connected directly to the can by a simple single current collector (tab) welded to the can. In typical cylindrical cell design, the active internal cathode material is then connected to the power terminal on the end cap. Typically, the end cap is a complex and composite design made from both aluminum and steel.

Typical battery cell features contained within a conventional prismatic battery end cap include a fill-hole that allows for the cell's activation during the manufacturing process; a valve that allows the cell to vent gas during an internally unsafe high-pressure event; and a power terminal that allows the cell to transfer power to the outside world.

Improvements to address these and other limitations of conventional cylindrical and prismatic batteries are desired.

SUMMARY OF THE INVENTION

A compact, robust, multifunctional and highly manufacturable rechargeable battery cell is provided. The cell design dedicates minimal internal volume to inert components of the cell. This is accomplished, in part, by providing multiple functionalities to individual cell components.

The cell's primary packaging is comprised of aluminum alloy. The cell has two large, symmetrically-centralized power terminals, for the positive and negative terminal, capable of achieving clean contact or a strong weld joint with external contacts. These terminals are integral parts of the cell's two end caps. One or both end cap also functions as a means of activating (filling with electrolyte) the cell through a symmetrically-centralized fill-hole, hermetically sealing the cell from the outside world. One or both end caps also provide for venting high pressure internal gases within the cell through an engineered vent score.

In one aspect of the invention, a metal can for use as an electrochemical battery cell container includes a side wall defining first and second open ends; a first metal end cap disposed at the first open end of the side wall and having an internal surface and an external surface; a terminal plate soldered to the external face of the first end cap; and a second metal plate disposed at the second open end of the side wall.

In one or more embodiments, the first metal plate comprises aluminum, and/or the external face of the first metal plate is nickel-plated, and/or the terminal plate of the first metal plate comprises nickel. The nickel plate has a thickness in the range of about 75 μm to about 125 μm, and/or the nickel plate is welded to the first metal plate, and/or the plate is resistance spot welded or ultrasonically welded.

In one or more embodiments of the invention, the first metal plate is welded to the first end of the side wall, and/or the second metal plate is integral with the second end of the side wall to form a closed end, and/or the second metal plate is welded to the second end of the side wall, and/or the second metal plate is sealed to the second end of the side wall with a crimp. The side wall and second metal plate include aluminum.

In one or more embodiments, the metal further includes an annular groove in at least one of the external and internal surfaces of the first metal plate, wherein the groove produces an arc of reduced thickness in the first metal plate.

In one or more embodiments, the annular groove is disposed between the periphery of the first metal cap and the soldered terminal. The arc is in the range of about 150 to about 360 degrees, or the arc is in the range of about 300 to about 180 degrees. The plate is capable rupture at the arc when exposed to a pressure differential of greater than a predetermined level.

Another aspect of the invention provides a method of making an end cap for use in an electrochemical battery cell container, including providing an aluminum end cap having an internal surface and a nickel-plated external surface; spot-welding a terminal plate to the nickel-plated external surface of the end cap; and soldering the spot-welded terminal plate to the end cap to form a mechanically strong weld.

In one or more embodiments, the soldering is reflow soldering.

In one or more embodiments, the nickel plate has a thickness in the range of about 75 μm to about 125 μm.

In one or more embodiments, the method further includes introducing an annular groove in at least one of the external and internal surfaces of the aluminum end cap, wherein the groove produces an arc of reduced thickness in the end cap.

In one or more embodiment, the groove is stamped or scored into the end cap.

In another aspect of the invention, a metal end cap for use in an electrochemical device includes a metal end cap having an upper surface and a lower surface; and a terminal plate soldered and spot-welded to the upper surface of the end cap.

In one or more embodiments, the metal end cap comprises aluminum, or the upper surface face of the end cap is nickel-plated, or the terminal plate comprises nickel. The nickel terminal plate has a thickness in the range of about 75 μm to about 125 μm.

In another aspect of the invention, an electrochemical cell includes an electrode assembly comprising a positive electrode, a negative electrode and an electrolyte; an aluminum container housing the electrode assembly and comprising a side wall and upper and lower open ends and; a first aluminum end cap laser welded to the upper open end of aluminum container; and a second aluminum end cap laser welded to the lower open end of aluminum container, wherein the second end caps is at least 50% thicker than the thickness of the container side wall.

In one or more embodiments, the container comprises an aluminum alloy.

In one or more embodiments, the cell further includes a central fill hole in the second end cap for introducing electrolyte into the container interior.

In another aspect of the invention, an electrochemical device includes an electrode assembly comprising a positive electrode, a negative electrode and an electrolyte; a cylindrical container housing the electrode assembly and having at least one opening; an end cap disposed to cover the opening, the end cap defining a centrally-located fill hole; and a plug sealingly disposed in the centrally located fill hole.

In one or more embodiments, the plug serves as a terminal for connecting the device to an external connection.

In one or more embodiments, the plug comprises a sealing member sealingly disposed in the fill hole and a deformable metal insert capable of pressing against the sealing member to form a liquid impermeable seal.

In one or more embodiments, the centrally located fill hole comprises a feedthrough inlet fittingly disposed within the hole and connected to the interior of the device.

In one or more embodiments, the feedthrough inlet includes a rivet having a substantially flat head defining a hole corresponding to the fill hole and extending over a portion of an external face of the end cap and a hollow stem extending into the interior of the cylindrical container; and a rivet backing disposed at an internal face of the end cap and engaged with a distal portion of the rivet stem.

In one or more embodiments, the fill hole further includes an upper insulating member disposed between the rivet and the end cap and defining a hole corresponding to the fill hole; and a lower insulating member disposed between the end cap and the rivet backing.

In one or more embodiments, the rivet includes nickel-plated steel, and/or the container includes aluminum and/or the end cap includes aluminum.

In one or more embodiments, the end cap is at the negative end of the device, or the end cap is at the positive end of the device.

In one or more embodiments, the plug includes a plastic seal and a metal insert.

In one or more embodiments, the end cap is welded to the open end of the container.

In one or more embodiments, the end cap is welded to the opening of the containing.

In one or more embodiments, the container further includes a second opening at the opposing end of the container and a second end cap is disposed to cover the second opening.

In one or more embodiments, the second end cap is welded to the second opening of the container.

In one or more embodiments, the second end cap is sealed to the second opening of the container with a crimp seal.

In one or more embodiments, the second end cap includes aluminum.

In another aspect of the invention, a method of filling an electrochemical cell with electrolyte includes (a) providing an electrochemical assembly including a positive electrode and a negative electrode housed in a cylindrical container and having at least one opening; and an end cap sealing the opening, the end cap defining a centrally-located fill hole; (b) introducing an electrolyte into an interior of the device through the fill hole; and (c) sealing the fill hole with a plug.

In one or more embodiments, the step of sealing the fill hole includes fittingly disposing a seal in the fill hole; and pressing a deformable metal insert into the sealed fill hole.

In another aspect of the invention, an electrochemical device includes a spirally wound electrochemical assembly having a sidewall and upper and lower faces, said electrochemical assembly including a separator interposed between a positive electrode comprising a positive current collector having a layer of positive electroactive material deposited thereon, the current collector having uncoated edge portions, and a negative electrode comprising a negative current collector having a layer of negative electroactive material deposited thereon, the current collector having uncoated edge portions, wherein the uncoated edge portions of the positive and negative electrodes are on opposite faces of the spirally wound assembly; a plurality of conductive tabs in electrical contact with the uncoated portions of at least one of the positive and negative current collectors and extending outward from the current collector, wherein the tabs of the at least one of the positive and negative current collectors are spaced apart from one another such that the conductive tabs are located within a predetermined region of the face of the spiral winding so that the tabs intersect when folded towards the center of the spirally wound face and fold into a second opposing region of the face of the spiral winding.

In one or more embodiments, the device includes tabs for both positive and negative electrodes.

In one or more embodiments, the tabs are aligned within 100 degrees of one another of on the face of the spiral winding.

In one or more embodiments, the tabs are aligned within 90 degrees of one another on the face of the spiral winding.

In one or more embodiments, the tabs are of different lengths.

In one or more embodiments, the tab length is selected so that the ends of the tabs are aligned when folded.

In one or more embodiments, the device comprises four tabs for each electrode

In one or more embodiments, the device comprises 3 to 10 tabs per electrode.

In one or more embodiments, the device comprises 1 tab per 200 $cm^2$ area of electrode.

In one or more embodiments, the tabs of each electrode are secured to a connecting strap.

In one or more embodiments, the connecting strap is electrically connected to a terminal of a case housing the spirally wound electrochemical assembly.

In another aspect of the invention, a method of assembling an electrochemical device, includes Interposing a separator between a positive electrode comprising a positive current collector having a layer of positive electroactive material deposited thereon and a negative electrode comprising a negative current collector having a layer of negative electroactive material deposited thereon to form a multilayer electrode assembly, wherein each of the current collectors has uncoated edge portions and a plurality of conductive tabs in electrical contact with and extending outward from the uncoated portions of the current collectors, wherein the uncoated edge portions of the positive and negative electrodes are on opposite sides of the a multilayer electrode assembly, spirally winding the multilayer electrode such that the tabs of a selected current collectors are aligned within a predetermined region of the spiral winding, folding the tabs of a selected electrode towards the center of the spiral winding such that the tabs intersect one another and the tab ends are located in a second non-overlapping region of the spiral winding; collecting the overlapped tabs of the selected electrode at a point beyond the tab intersection; and securing the collected tabs of a selected electrode to a connecting strap.

In one or more embodiments, tab lengths are select such that the collected tabs are aligned at their terminal edges.

In one or more embodiments, the tabs are spaced apart on the uncoated edge on a selected electrode such that the tabs are aligned within the predetermined region of the spiral winding.

BRIEF DESCRIPTION OF THE DRAWING

The invention is described with reference to the following figures, which are provided for the purpose of illustration only, the full scope of the invention being set forth in the claims that follow.

FIG. 1 is an exploded diagram illustrating the internal components of a battery cell design according to one or more embodiments of the invention.

FIG. 2 is a cross-sectional illustration of an assembled battery cell according to one or more embodiments of the invention.

FIG. 3 is a view of a positive (cathode) end cap showing a pressure release vent and an interface terminal.

FIG. 5A depicts a perspective view the sealing of the fill hole in the negative end cap with a metal plug and a plastic seal after cell activation.

FIG. 5B depicts a cross-sectional enlarged view of the sealing of the fill hole in the negative end cap with a metal plug and a plastic seal after cell activation.

FIG. 6A is a plan view of an electrode sheet with tabs.

FIG. 6B is an enlarged plan view of an electrode sheet with tabs.

DETAILED DESCRIPTION

Figure 4A:
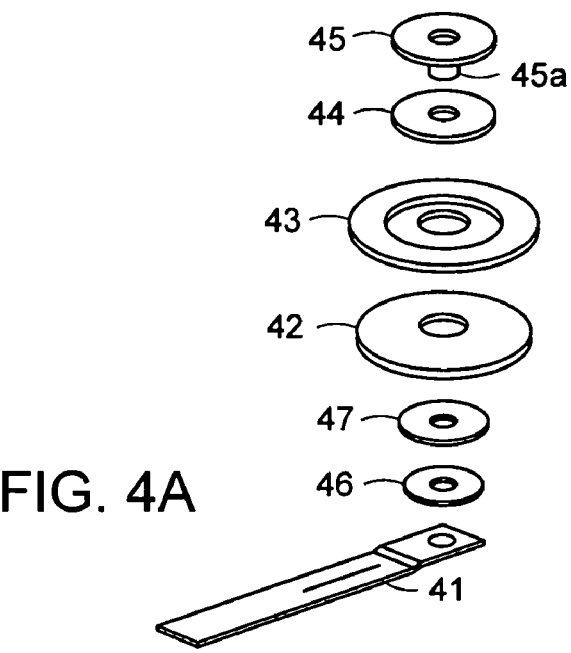
FIG. 4A provides an exploded view of the components used in a negative (anode) end cap assembly.

Conventional battery cell end cap design incorporates one or more of a fill-hole, a safety vent, and a power terminal into the design of an end cap. These features are usually separate, individual, and bulky entities occupying their own internal volume on the cell's end cap. Battery cells that utilize a symmetrically centralized activation fill-hole have a distinct advantage during manufacture over cells whose activation fill holes are off center and require orientation during fill. Battery cells that utilize a symmetrically centralized battery terminal have a distinct advantage in commercial applications over cells whose power terminal is off center and require specific orientation during use and/or packaging into larger format strings of cells.

In one or more embodiments of the present invention, a cylindrical cell is provided that includes upper and lower welded end caps. The cell's primary packaging (can and end caps) is composed of aluminum alloy. The weld seal is typically obtained by laser welding, or optionally by other metal joining methods such as ultrasonic welding, resistance welding, MIG welding, TIG welding. The end caps of the doubly (upper and lower ends) welded container may be thicker than the can wall, e.g., the end caps may be up to about 50% thicker than the can wall. This differential in thickness is not accomplished by other means, such as deep drawing. The doubly welded cell packaging can provide significantly greater cell volume than crimped seals or singly welded cells. In addition, the thick end caps improve mechanical robustness of the cell, for example, against crushing. The additional cell modifications incorporated into the cell design permit the use of a doubly welded packaging, which is not otherwise possible or convenient with conventional battery cell designs.

In one or more embodiments, the battery cell package design uses a low weight and highly compact aluminum housing, and is typically an aluminum alloy such as Al3003H14. Aluminum and aluminum alloys provide high specific modulus and high specific stiffness in the structure and a high strength to weight ratio. Aluminum is also one of the few materials that are stable at the cathode potential of a Li-ion cell. Several features of the battery design are shown in the exploded diagram of FIG. 1. The cell design includes a positive end cap (1), a cathode extension tab (2), an insulation disc (3), a cylindrical tube (4), a negative end cap (5), anode current collection tabs (6), cathode current collection tabs (7), and internal active cathode and anode materials (electrodes) (8). The positive end cap (1) contains both the positive battery terminal for the cell as well as the cell's vent mechanism. The cathode extension tab (2) acts as an electrical connection between the cathode current collection tabs (7) and the cell's external positive terminal (1). The insulation disk (3) includes slots (3a) through which the current collection tabs extend. The insulation disc (3) prevents the cathode current collection tabs (7) and the cathode extension tab (2) from shorting to the internal active cathode and anode materials (8). The cylindrical tube (4) acts as the main housing for the cell package.

During assembly, weld and crimp joints are used to connect both sets of current collector tabs (6) and (7) to both end caps (5) and (1), respectively, via the extension tab (2) and the integrated extension tab (5a) found in the negative end cap (5). Both end caps are welded to tube (4) to make the cylindrical cell. The negative end cap (5) contains both the cell's negative battery terminal as well as the cell's fill hole (discussed in greater detail below), both of which share the same internal volume and external space and are symmetrically centered in the cell. Negative end cap (5) also has an integrated extension tab (5a) for making an electrical connection between the anode current collection tabs (6) and the cell's external negative terminal located on the negative end cap (5). An insulation disk (3) with slots (3a) is also used at the anode to prevent shorting of the anode current collection tabs (6) and anode extension tab (5a).

An assembled cell incorporating the design features of FIG. 1 is shown in FIG. 2 in cross-section, where like elements are similarly labeled. Once assembled, the cell incorporates favorable features for both manufacturing and customer interface in a volumetrically efficient package. This allows for the vast majority of the inside of the cell to be used for active material, greatly improving the cell's energy storage capacity to volume ratio.

Individual components and features of the cell are described.

The positive end cap (1) includes an engineered vent score (10) and a nickel interface terminal (9), as illustrated in FIG. 3. The engineered vent score opens under a predetermined internal pressure, letting large amounts of gas and material exit the cell if necessary. The vent is an annular groove located near the periphery of the positive end cap, disposed between the end cap circumference and the nickel terminal. The groove can be located on the inner or outer face of the end cap, or both. In one or more embodiments, the groove is located on both the inner and outer faces of the end cap. The grooves may oppose one another or be offset from one another. The groove provides a thinned radial section in the end cap that is designed to rupture at a preselected pressure. The annular groove forms an arc on the end cap that is in the range of about 150 degrees to a full 360 degrees, or about 180 degrees to about 300 degrees. The actual arc length will depend on the size of the cell. The arc length can be selected so that the end cap hinges when ruptured and the ruptured end cap is not severed from the battery can, but also can be up to about a full 360 degree arch with no apparent hinge. A further advantage of the annular groove is that it serves to thermally insulate the terminal during welding of the end cap to the battery body. The groove is introduced by conventional methods, such as stamping, scoring or scribing and the like.

The nickel interface terminal (9) provides a low resistance, corrosion resistant battery terminal, as well as a weldable interface for connecting batteries together in packs. The nickel plate can range in thickness and typically has a thickness in the range of about 75 µm to about 125 µm. Thicker terminal plates are particularly well-suited for high power batteries. In one or more embodiments, the body of the cathode cap is aluminum and, for example, is the same aluminum alloy as the battery tube. In one or more embodiments, the cathode cap may be is plated with a layer of nickel on its outside surface. The nickel interface terminal is then either resistance (spot) welded to the cathode cap to give a mechanically robust interface, re-flow soldered to the nickel plating layer to give an electrically robust interface between the two parts, or both. Other welding and soldering techniques may be used, for example, ultrasonic welding or electrically conductive adhesives. Suitable solder includes solder having a melting temperature above the maximum use temperature of the battery. This joining technique between the Ni terminal and the Al cathode cap is unique in the battery industry.

The pressure vent occupies a peripheral region of the end cap face and does not interfere with the location and securing of the nickel terminal. The nickel terminal cross-sectional area can be quite large and can occupy a significant portion of the end cap face. This serves to reduce cell impedance and to provide cell to cell weld-ability during pack assembly.

Figure 4B:
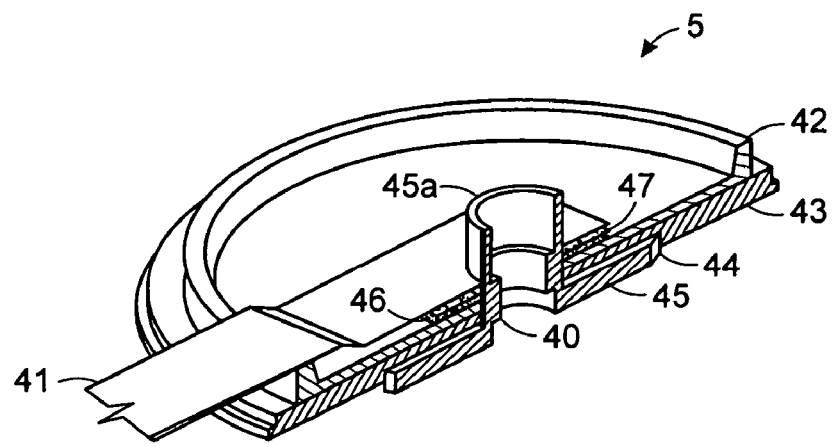
FIG. 4B shows a cross-sectional view of an assembled negative end cap.
Figure 4C:
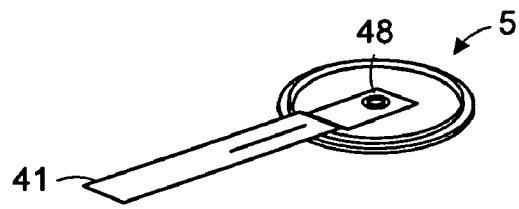
FIG. 4C shows a perspective view of an assembled negative end cap after riveting.

FIGS. 4A-4C depict a negative end cap (5) including a centrally located fill hole (40). The fill hole is used to activate the cell once assembled and is defined, at least in part, by a hollow bore rivet (45) which makes up the power terminal. Dual use of the central location of the negative end cap as both a fill hole and as a power terminal provides efficient use of space and does not interfere with battery operation. The fill hole (40) is centrally located in the end cap face. The centrally located fill hole provides a feedthrough inlet fittingly disposed within the hole and connecting to the interior of the cell. Electrolyte is introduced through this feedthrough inlet during activation.

The negative end cap is constructed by assembling the constituent components as illustrated in the exploded diagram of FIG. 4A. Upper gasket (44) is placed into end cap body (43), which may contain a depression for receiving the gasket. The hollow bore rivet serving as the power terminal (45) is assembled into upper gasket (44). The stem (45a) of rivet (45) extends through a central opening of both the upper gasket (44) and end cap body (43). The assembly is flipped over, and seal gasket (47) is inserted onto gasket (44) and placed onto body (43). Lower gasket (42), seal gasket (47), and rivet backing disc (46) are assembled and positioned as illustrated in FIG. 4A. Extension tab (41) is inserted onto the stem of rivet (45). The as-assembled components, prior to crimping are shown in FIG. 4B.

Rivet (45) may be Ni plated steel for both good corrosion resistance and good weldability, which serves as the power terminal for the cell. The flat head of rivet (45) extends over a portion of the external face of the end cap and the hollow stem (45a) extends into the interior of the cell. It also includes a fill hole through its center with an engineered ledge to help sealing, a symmetric shape, and a centralized rivet stem for sharing space and symmetry between the battery terminal and the fill hole. Extension tab (41) connects the power terminal (45) with the cell's internal active anode material. A lower gasket (42) protects the extension tab (41) from contacting the end cap body (43), which is at a different voltage potential. Body (43) is hermetically sealed to the battery tube (not shown) or the main body of the cell through any number of methods, including but not limited to the aforementioned methods of crimping and welding. Upper gasket (44) insulates the power terminal (45) from the end cap body (43), which are at different voltage potentials. Rivet backing disc (46) helps to create a robust press-rivet clamp force onto body (43). Seal gasket (47) helps to achieve a robust seal underneath the press-rivet.

The entire assembly may be crimped together by pressing and deforming the stem of rivet (45), as illustrated in FIG. 4C, squeezing all of the parts together to form press-rivet (48) and creating a good electrical contact between the extension tab (41) and the power terminal (45).

After the end caps have been welded to the cell's tube, the cell is activated by filling electrolyte through the hole in the power terminal (45). Turning now to FIGS. 5A and 5B, fill hole (40) is hermetically sealed by means of fill hole plug seal (50) (e.g., a high temp plastic seal) and fill hole plug (51), a deformable insert, e.g., a deformable metal insert. Fill hole plug seal (50) is pressed into the fill hole opening after the end cap has been sealed to the tube and the cell has been activated with electrolyte. The fill hole plug (51) is then pressed into this same fill hole, expanding, clamping and holding the seal (50) up against the engineered ledge of the rivet (45) and achieving a hermitic seal where the fill hole used to be.

The internally active material of the cell includes two electrodes, a cathode and an anode. One contributor to the impedance of a battery cell is the lack of current carrying paths between the active cell materials (anode and cathode) and the external cell terminals. It has been surprisingly discovered that overall cell impedance can be significantly lowered by using more current carriers, or "tabs", than conventional cylindrical (wound assembly) cells, whose designs call for one or two tabs per electrode. In one or more embodiments of the invention, a plurality of tabs are joined at a larger current collector on either side of the cell called an extension tab, which then makes the connection with each of the battery terminals of the cell. In one or more embodiments, the electrode includes about 3 to about 10 tabs, and for example, may include four tabs. In other embodiments, the electrode includes one tab per 200 $cm^2$ area of electrode. High power battery cells will require a higher density of tabs than low power cells.

In one or more embodiments of the invention, each of the electrodes in this cell design uses several, e.g., four or more, current collecting tabs to conduct current out of each of the active material, e.g., cathode and anode, and into the battery terminals. FIG. 6A depicts an exemplary electrode sheet (60). The electrode sheet (60) includes an integral current collector substrate (66) and a layer of electroactive material (67) in electrical connection to the current collector substrate. Current collecting tabs (61), (62), (63), (64) extend from an edge portion (68) of the electrode.

The tabbed electrodes are then organized into an electrochemical cell. A separator sheet, e.g., two separator sheets, is interposed between the cathode and anode sheets such that the tabs of the cathode and anode are located at opposite sides of the assembly. The multilayer assembly is spirally wound to form a spiral electrochemical assembly, known as a "jellyroll." A jellyroll (8) with extended tabs (6), (7) is illustrated in FIG. 1.

The tabs can be of different length, which reflect their distances from the jelly role center when wound. The length of the tabs may be adjusted before or after winding the jellyroll. In order to form the tabbed electrode, a portion of the electroactive material is removed from an edge of the electrode to create a clean surface for electrical contact as shown in FIG. 6B (not drawn to scale). The tabs are electrically connected, e.g., by welding, riveting, crimping or other similar technique, to an exposed portion of the electrode. The tabs are then covered with a non-reactive tape (65), which covers the exposed metal tabs and prevents undesired chemical reactions with the cell chemicals. Tape (65) covers both sides of the electrode in the vicinity of the tabs. The tape covers that portion of the tab that lies over the electrode and may cover some or all of the underlying electrode that remains exposed, i.e., that is not covered by either active electrode layer or a current collecting tab. At least a portion of the tab that extends out from the electrode is not covered by tape.

Figure 7B:
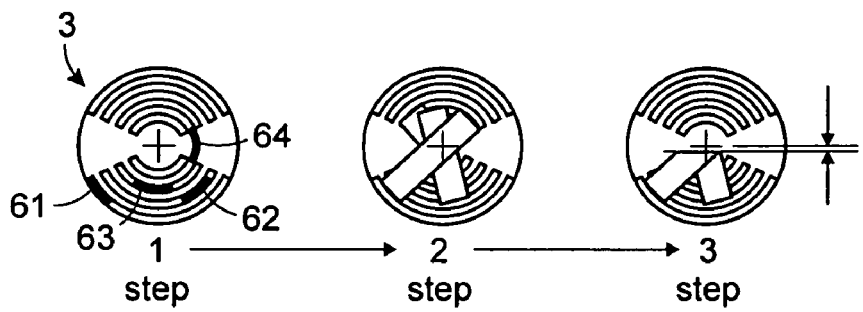
FIG. 7B depicts a series of views of the cell design according to one or more embodiments of the invention, and illustrates the location and bending of current collecting tabs.
Figure 7A:
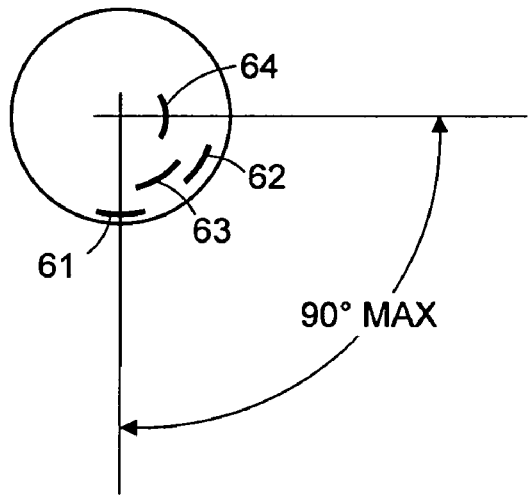
FIG. 7A shows a top view of a battery can indicating the exemplary location of collector tabs within a 90 degree quadrant.

In order to maximize the reduction in impedance of a cell through the addition of tabs, these four tabs can be positioned at equal intervals along each of the two electrode's lengths, e.g., as close to ⅛th, ⅜th, ⅝th, and ⅞th of the electrode length as possible, to thereby minimize the distance that current must travel through the electrode in order to get out and into the battery terminals. Other arrangements using more or less than 4 tabs are also contemplated. Once wound together, the jellyroll has the respective four tabs sticking out of either end, as is illustrated in FIG. 1. These tabs are gathered together and connected to an external terminal, as illustrated in FIGS. 7A and 7B. According to one or more embodiments of the present invention, a cell tabbing design is provided to control and capture all of the tabs in a volumetrically efficient, manufacturable, and mechanically robust manner.

In one aspect of the tab design, the thickness of the materials that make up the jellyroll is controlled. Each of the materials (anode electrode, cathode electrode, and separator) have thickness controlled to a very tight tolerance (approximately +/−2 um each). This allows one to model and reliably predict exactly how these materials will spiral up into a jellyroll, including the number of turns and the finished diameter. This permits the accurate location of the tabs within the jellyroll.

In another aspect of tab design, the tab positions on the electrodes are selected before they are wound into the jellyroll. The tabs are placed along the length of each of the electrodes in positions that are both close to the $\frac{1}{8}^{th}$, $\frac{3}{8}^{th}$, $\frac{5}{8}^{th}$, and $\frac{7}{8}^{th}$ electrically optimized connections, e.g., for a 4-tab design, as well as positions that are predicted to align after the electrodes have been wound into the jellyroll. Tab positions are selected such that, for example, the four tabs of a single electrode are aligned with each other within a preselected region of the top face of the jellyroll. For example, the four tabs are position on a cathode sheet so that, on assembly into a jelly roll, the 4 tabs of the cathode sheet project from the face of the jelly roll in a selected region of the roll face. In one or more embodiments, the tabs are aligned within a 90 degree quadrant or larger, for example 150 degrees. The region, e.g., a 90 degree quadrant, is measured from the centerline of each tab, to account for the tab widths. In some embodiments, the tabs are located in an approximately 140 degree arc window. This alignment aids in the control and capture of each set of four tabs. Exemplary alignment of the tabs within a 90 degree quadrant is shown in FIG. 7A.

A third aspect of tab design is selection of the appropriate tab bending, as is illustrated in FIG. 7B. This is how the four tabs (61), (62), (63), (64) are captured and connected to the battery terminals. Step 1 of FIG. 7B shows the top of a battery and the location of all four tabs as they project from the face of the jellyroll. An insulation disc (3) is positioned over the end of the jellyroll, and the tabs are inserted through slots in the insulation disc. The insulation disc isolates each tab from the jellyroll. First all four tabs are bent towards the center axis (indicated by an "+" in FIG. 7B) of the jellyroll over an insulation disc (3). The result is a stack of tabs fanning in a region of up to about 140 degrees over of the face of the jellyroll. As noted previously, the tab length may vary. In one or more embodiments, the tab closest to the center axis, e.g., tab (64), is the shortest and the tab farthest from the center axis, e.g., tab (61), is the longest. The tab closest to the center of the jellyroll may be cut to a shorter length than the rest of the tabs, and each subsequent outwardly positioned tab is longer than the previous inner tab. The result is that when all four tabs are folded over, as illustrated in step 2 of FIG. 7, their ends align the same distance away from the axis of the jellyroll. Once the tabs are all laying flat, they are in the position that they will be in when the cell is finished. However, they must first be connected to the battery terminal's extension tab. In order to achieve this they are all bent together at about a 90° angle to the face of the jelly roll and parallel to the axis of the jellyroll, as illustrated in step 3 of FIG. 7. This consolidates the four tabs into one entity to which the battery terminal's extension tab can easily be welded.

Figure 8:
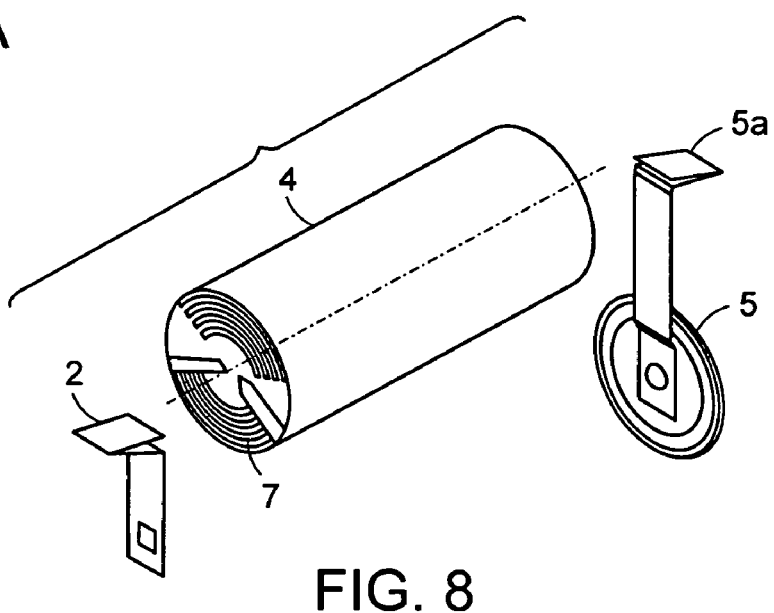
FIG. 8 depicts the attachment of current extension tabs to the respective terminals.

The fourth aspect of tab design is the joining of the battery extension tabs to the four electrode tabs. In one design this is achieved through ultrasonic welding, but resistance welding or other metal joining technique could be adopted just as easily. In one embodiment, the extension tabs are first folded in a way that allows a welder to pinch them over the four electrode tabs, however, other means of joining the components are contemplated. The thicker extension tab protects the thinner electrode tabs from being damaged by the welder. The joining is achieved in a manner that allows the four electrode tabs as well as the extension tabs to be both folded back down flat, achieving a very volumetrically efficient cell design. Once the tabs have been welded and folded flat, the cell's end caps are welded to the tube, resulting in very little space used for managing tabs that could otherwise be used for additional cell energy capacity. This is illustrated in FIG. 8.

The basic idea and design of this battery cell can be applied to almost any battery cell with very few exceptions. Alternative designs may be developed that better fit specific applications, but the basic premise remains the same; this cell invention efficiently uses area and volume to create a robust, lightweight, and centrally symmetric battery ideal for both manufacturing and customer interface. The design can easily be modified to incorporate a steel housing instead of an aluminum housing by reversing the polarity of the internal components.

In one aspect, the rechargeable battery cell design described in this document has many advantages over conventional battery design in both end user application as well as cell manufacturing, namely, a centrally located power terminal and a centrally located electrolyte fill hole. Conventional cell designs use volumetrically inefficient crimp joining.

One aspect of the cell design allows the cell to be designed with the more volumetrically efficient welding seal between the end cap and can, while placing both the fill-hole and the power terminal directly in the same desirable location, directly in the center of the cell.

Additionally, by using two end caps and a tube instead of one end cap and a single ended can, a more robust and more manufacturable joint between the internal extension tabs and the battery terminals is achievable on both ends of the cell now instead of only one.

In one or more embodiment, the above design uses four tabs per electrode instead of the more common single tab. This vastly reduces the impedance of the cell as a whole, which is very important in high power applications.

In one or more embodiments, the cell utilizes the additional thickness of a power terminal to obtain features necessary for sealing the fill-hole with a plug, allowing the actual seal to be more robust while remaining unseen and unobtrusive to the cells outline.

The cylindrical cell according to one or more embodiments utilizes a nickel plate soldered to the aluminum housing. This allows the cells main housing to be manufactured from the light weight and electrically conductive aluminum. The terminals are made from the heavier, yet more corrosion resistant and more weld friendly Ni material.

The cell design also locates the vent score on the bottom of the cell. This opens up volume on the top of the cell that can be used for increasing the cell's energy storage capacity. The vent described in this design is unique in the fact that it is much larger than conventional vents and is located around the perimeter of power terminal as opposed to asymmetrically beside it or under it. This allows gasses and/or material to escape unimpeded during a dangerous internally high pressure event.

The invention claimed is:

1. An electrochemical device, comprising:
a spirally wound electrochemical assembly having a sidewall and upper and lower faces, said electrochemical assembly comprising:

a terminal for making a connection external to the device;
a separator interposed between a positive electrode comprising a positive current collector having a layer of positive electroactive material deposited thereon, the current collector having uncoated edge portions, and a negative electrode comprising a negative current collector having a layer of negative electroactive material deposited thereon, the current collector having uncoated edge portions, wherein the uncoated edge portions of the positive and negative electrodes are on opposite faces of the spirally wound assembly;
a plurality of conductive tabs in electrical contact with the uncoated portions of at least one of the positive and negative current collectors and extending outward from the current collector, wherein the tabs of the at least one of the positive and negative current collectors are spaced apart from one another such that the conductive tabs are located within a predetermined region of the face of the spiral winding so that during assembly the tabs extending from one of the at least one of the positive and negative current collectors intersect when folded towards the center of the spirally wound face, and fold into a second opposing region of the face of the spiral winding; and
a foldable terminal extension that secures the tabs from the one of the at least one of the positive and negative current collectors to form an electrical connection with the terminal, such that the foldable terminal extension and the tabs that are secured by the terminal extension lie flat with respect to the spiral winding.

2. The device of claim 1, wherein the device includes tabs for both positive and negative electrodes.

3. The device of claim 1, wherein the tabs are aligned within 100 degrees of one another on the face of the spiral winding.

4. The device of claim 1, wherein the tabs are aligned within 90 degrees of one another on the face of the spiral winding.

5. The device of claim 1, wherein the tabs are of different lengths.

6. The device of claim 5, wherein tab length is selected so that the ends of the tabs aligned when folded.

7. The device of claim 1, wherein the device comprises four tabs for each electrode.

8. The device of claim 1, wherein the device comprises 3 to 10 tabs per electrode.

9. The device of claim 1, wherein the device comprises 1 tab per 200 $cm^2$ area of electrode.

10. The device of claim 1, wherein the terminal extension is in the form of a connecting strap.

11. The device of claim 5, further comprising a case that houses the spirally wound electrochemical assembly.

12. The device of claim 1, wherein the spirally wound electrochemical assembly is disposed in a metal can, the metal can comprises,
a side wall defining first and second open ends;
a first metal end cap comprising aluminum, the first metal end cap disposed at the first open end of the side wall and having an internal surface and an external surface, the external surface of the first metal end cap is nickel-plated;
the terminal being in the form of a plate comprising nickel soldered to the external surface of the first metal end cap; and
a second metal plate disposed at the second open end of the side wall.

13. The device of claim 1, wherein the spirally wound electrochemical assembly is disposed in a cylindrical container housing having at least one opening;
an end cap is disposed to cover the opening, the end cap defining a centrally-located fill hole; and
a plug is sealingly disposed in the centrally located fill hole.

14. The device of claim 13, wherein the plug serves as the terminal for connecting the device to the external connection.

15. The device of claim 13, wherein the plug comprises a sealing member sealingly disposed in the fill hole and a deformable metal insert capable of pressing against the sealing member to form a liquid impermeable seal.

16. The device of claim 13, wherein the centrally located fill hole comprises a feedthrough inlet fittingly disposed within the hole and connected to the interior of the device.

17. The device of claim 16, wherein the feedthrough inlet comprises:
a rivet having a substantially flat head defining a hole corresponding to the fill hole and extending over a portion of an external face of the end cap and a hollow stem extending into the interior of the cylindrical container; and
a rivet backing disposed at an internal face of the end cap and engaged with a distal portion of the rivet stem.

18. The device of claim 17, wherein the fill hole further comprises:
an upper insulating member disposed between the rivet and the end cap and defining a hole corresponding to the fill hole; and
a lower insulating member disposed between the end cap and the rivet backing.

19. The device of claim 1, wherein the terminal extension has an overlapped portion, such that ends of the tabs from the one of the at least one of the positive and negative current collectors are held within the overlapped portion.

20. The device of claim 19, wherein the terminal extension and the tabs that are held are foldable from a first position extending along an axial direction of the spiral winding to a second position where the overlapped portion lies flat with respect to the spiral winding.

21. The device of claim 20, further comprising pieces of tape that cover portions of the plurality of conductive tabs and adjacent areas of the uncoated portions of the at least one of the positive and negative current collectors.

22. The device of claim 21, wherein the terminal extension secures the tabs by one of an ultrasonic and resistance weld.

23. The device of claim 1, wherein the terminal extension has a rectangular shape with planar opposing surfaces that respectively face inwardly and outwardly along an axial direction of the spirally wound electrochemical assembly.

* * * * *